UNITED STATES PATENT OFFICE.

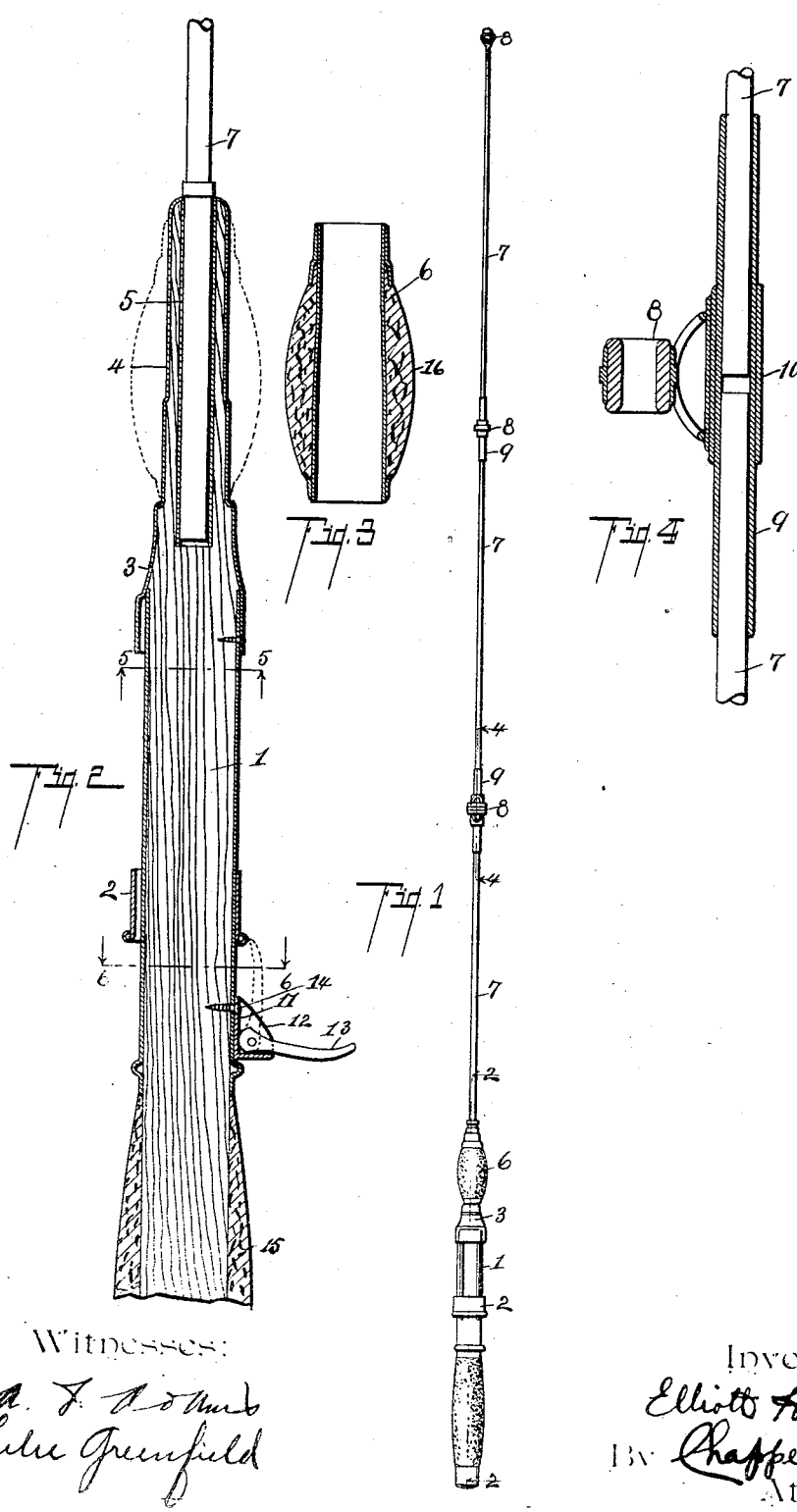

ELLIOTT H. CRANE, OF KALAMAZOO, MICHIGAN.

FISHING-ROD.

No. 931,277.  Specification of Letters Patent.  Patented Aug. 17, 1909.

Application filed January 11, 1907. Serial No. 351,831.

*To all whom it may concern:*

Be it known that I, ELLIOTT H. CRANE, a citizen of the United States, residing at Kalamazoo, Michigan, have invented certain new and useful Improvements in Fishing-Rods, of which the following is a specification.

This invention relates to improvements in fishing rods.

The objects of this invention are, First, to provide an improved fishing rod of metal which has a suitable and uniform elasticity or resiliency, and at the same time does not possess an objectionable spring action likely to be present in fishing rods constructed of metal. Second, to provide an improved metal fishing rod made up of detachable sections which, when united, produce a rod of uniform elasticity or resiliency from end to end. Third, to provide an improved metal fishing rod in which the balance may be adjusted to suit the requirements or wishes of the particular user. Fourth, to provide in a fishing rod, made up of sections, an improved ferrule. Fifth, to provide in a fishing rod an improved grip.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which,—

Figure 1 is an elevation of my improved fishing rod. Fig. 2 is an enlarged detail longitudinal section of the base or grip section of my improved fishing rod, the upper or auxiliary grip being removed, its position being indicated by dotted lines. Fig. 3 is an enlarged longitudinal section of the auxiliary grip. Fig. 4 is an enlarged detail longitudinal section taken on a line corresponding to line 4—4 of Fig. 1, showing the structural details of one of the ferrules.

In the drawing the sectional views are taken looking in the direction of the little arrows at the ends of the section lines, and similar reference characters refer to similar parts throughout the several views.

Referring to the drawing, the handle or base section 1 of my improved fishing rod is preferably formed of wood and provided with a fixed grip 15 at its lower end and a detachable auxiliary grip 16 at its upper end. The handle is provided with a suitable reel seat, the adjustable clamping member 2 thereof being of the usual or any desired construction. On the upper end of the handle sections, beyond the fixed clamping member 3 of the reel seat, is a casing 4. This casing expands downwardly so that the detachable grip 16 may be slipped thereon and retained by friction. The grip 16 preferably consists of a tapered sleeve 6 with suitable grip portion mounted thereon; see Fig. 3.

The rod proper of my improved fishing rod consists of sections 7 which are detachably secured together by means of suitable ferrules. These ferrules preferably consist of an inner tube 9, adapted to receive the sections, and a reinforcing sleeve 10 arranged centrally thereon, to embrace the ends of the sections. This enables their being made of comparatively light material, and at the same time the structure possesses sufficient strength for the purposes required. The runners or line guides 8 are mounted on these ferrules.

The end of the handle section is provided with a socket 5 of considerable depth, which permits of the adjustment of th ebase rod-section therein, whereby the hang or balance of the rod can be quite largely controlled.

To further add to the convenience of the handle section, I provide a finger grip preferably consisting of a trigger-like piece 13 which is pivoted to a plate 11 having downwardly projecting ears 12 thereon. The plate 11 is secured to the handle by means of suitable screws as 14. This permits of the finger grip 13 being swung up to the position indicated by the dotted lines when it is not desired to use the same, or when it is desired to collapse the rod for packing or transportation.

By forming the rod sections of solid phosphor-bronze rods, I secure a rod which has the resilience and elasticity of a metal rod without the objectionable snappy, spring qualities such rods usually possess. It is also non-corrodible and is practically non-breakable. When the sections are assembled or joined, my improved fishing rod is of uniform elasticity and is found to be quite perfectly balanced.

By providing a detachable grip 16 in front of the reel seat the same may be used or removed as desired, some users desiring to use such a grip in some relations and not in others. The grip trigger is very convenient as it may be folded up out of the way when it is not desired to use the same, or for the purpose of packing.

A further advantage of my improved rod is that the rod sections may be made quite short; that is, there may be a number of joints in a comparatively short rod and at the same time the rod possess the desired elasticity and balance.

By forming the ferrules as I have described the proper joints are secured for the sections without affecting the balance of the rod.

I have illustrated and described my improved fishing rod in detail in the form preferred by me, on account of the structural simplicity and economy and convenience in assembling. I am, however, aware that it is capable of considerable variation in structural detail without departing from my invention.

Having thus described my invention, what I claim as new and desire to secure by Letters Patent, is,—

1. In a fishing rod, the combination with the rod sections; connecting ferrules therefor consisting of an inner tube adapted to receive the ends of said sections; and an outer short sleeve arranged centrally upon said tube to embrace the ends of said rod sections, for the purpose specified.

2. A handle for fishing rods having a fixed grip at its lower end; a reel seat on said handle above said fixed grip and an extension above said reel seat; and a detachable grip adapted to be slipped upon the said extension of said handle above said reel seat.

In witness whereof, I have hereunto set my hand and seal in the presence of two witnesses.

ELLIOTT H. CRANE. [L. S.]

Witnesses:
 OTIS A. EARL,
 LULU G. GREENFIELD.